United States Patent [19]

Velisavljevic

[11] Patent Number: 4,804,471

[45] Date of Patent: Feb. 14, 1989

[54] OIL-WATER SEPARATOR

[76] Inventor: Milisav Velisavljevic, P.O. Box 984, Waukegan, Ill. 60079

[21] Appl. No.: 73,565

[22] Filed: Jul. 15, 1987

[51] Int. Cl.$^4$ .......................................... B01D 17/022
[52] U.S. Cl. .................................... 210/265; 210/537; 210/540; 210/DIG. 5
[58] Field of Search .................... 210/265, 532.1, 537, 210/538, 540, 264, 269, 275

[56] References Cited

U.S. PATENT DOCUMENTS

| | | | |
|---|---|---|---|
| 261,574 | 7/1882 | Willsey | 210/264 |
| 597,258 | 1/1898 | Bovee | 210/537 X |
| 654,965 | 7/1900 | Frinke | 210/540 X |
| 1,159,044 | 11/1915 | Kelly, Jr. | 210/537 X |
| 1,182,465 | 5/1916 | Evans | 210/264 |
| 1,748,541 | 2/1930 | Davitt et al. | 210/540 |
| 2,808,933 | 10/1957 | Mobley | 210/532.1 X |
| 3,469,702 | 9/1969 | Perren | 210/540 X |
| 3,651,944 | 3/1972 | Shuttleworth | 210/265 |
| 3,830,371 | 8/1974 | Garcia | 210/265 |
| 3,915,858 | 10/1975 | Condolios | 210/540 X |
| 3,948,775 | 4/1976 | Otani et al. | 210/264 |
| 3,966,603 | 6/1976 | Grant | 210/540 X |
| 4,144,172 | 3/1979 | Bennecke et al. | 210/532.1 X |
| 4,191,651 | 3/1980 | Cheysson et al. | 210/265 |
| 4,202,778 | 5/1980 | Middelbeek | 210/532.1 X |
| 4,266,952 | 5/1981 | Turek | 210/264 X |
| 4,276,181 | 6/1981 | Cordier et al. | 210/265 X |
| 4,391,711 | 7/1983 | Jackson et al. | 210/540 X |
| 4,406,789 | 9/1983 | Brignon | 210/532.1 X |
| 4,554,074 | 11/1985 | Broughton | 210/540 X |

Primary Examiner—Robert Spitzer
Attorney, Agent, or Firm—Wood, Dalton, Phillips, Mason & Rowe

[57] ABSTRACT

A separator for continuously separating a mixture of immiscible liquids of differing densities into the constituents of the mixture including a vessel, a first upper outlet for the lower density constituents, a second upper outlet for the higher density constituents, an inlet in the vessel for the mixture located below the outlets, a conduit interconnecting the vessel above the inlet and the first outlet and a further conduit opening into the vessel below the inlet and connecting the interior of the vessel and the second outlet.

5 Claims, 1 Drawing Sheet

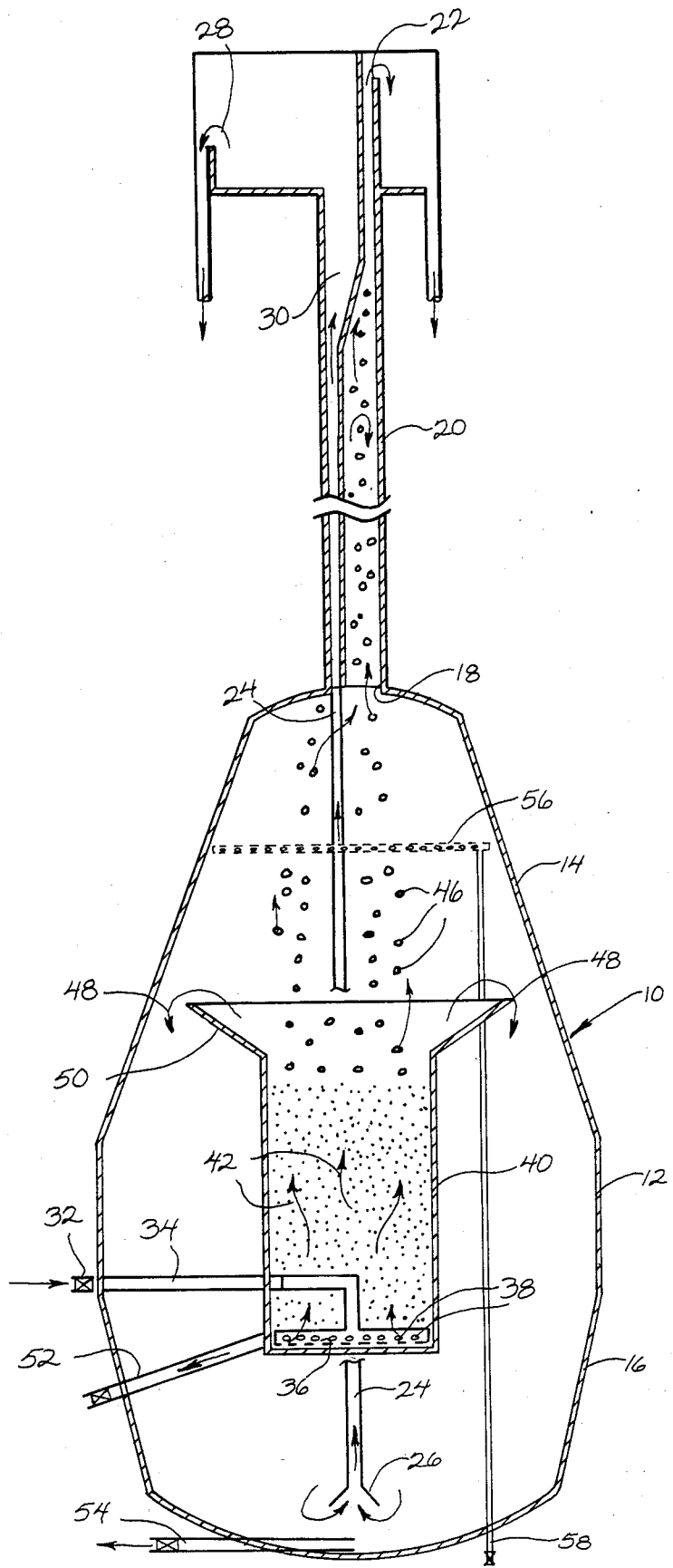

OIL-WATER SEPARATOR

FIELD OF THE INVENTION

This invention relates to a separator for continuously separating a mixture of immiscible liquids of differing densities into the constituents of the mixture; and more specifically, to an oil-water separator.

BACKGROUND OF THE INVENTION

Continued concern for the environment requires that industrial waste be appropriately treated before being discharged into the surroundings to avoid pollution. Industrial waste may be formed as by-products of industrial processes or, in many cases, as a result of inadvertent mistreatment of materials. In any event, a common industrial waste is a mixture of immiscible liquids of differing densities, the most common of which is an oil-water mixture.

For any of a variety of reasons, relatively small quantities of oil become mixed with large quantities of water so as to make storage uneconomical. Yet, because of the polluting attributes of such a mixture, the same cannot be discharged into rivers, streams, lakes or the like.

Also because of the volume of such mixtures, it is desirable to be able to treat the volume rapidly and preferably on a continuous basis and yet perform such treatment with inexpensive means with a minimal of moving parts so as to minimize energy consumption as well as the possibility of parts failure.

The present invention is directed to accomplishing the above.

SUMMARY OF THE INVENTION

IT is the principal object of the invention to provide a new and improved separator for continuously separating a mixture of immiscible liquids of differing densities into the constituents of the mixture. More specifically, it is an object of the invention to provide such a separator which has essentially no moving parts and which operates efficiently so as to reliably effect a high percentage separation of the constituents.

An exemplary embodiment of the invention achieves the foregoing object in a separator including a vessel. The apparatus includes a first upper outlet for the lower density constituent and a second upper outlet for the higher density constituent. An inlet is located in the vessel for the mixture to be separated and is located below the outlets. Means are disposed above the inlet for establishing fluid communication between the vessel and the first outlet and means, including a conduit opening into the vessel below the inlet, are provided to establish fluid communication between the vessel and the second outlet. By reason of the differing densities and immiscibility of the two components, the lower density component tends to separate and rise in the higher density component and thus flows upwardly to the first outlet. Conversely, the higher density component tends to move downwardly within the vessel and ultimately flows to the second outlet via the conduit.

In a preferred embodiment, coalescing means are located in the vessel at the inlet for coalescing droplets of the lower density constituents which typically will form a low percentage of the overall mixture.

The invention contemplates that the coalescing means include a bed of relatively fine particulate which opens to the vessel at its uppermost end and that the inlet opens to the bed near its lowermost end.

According to one embodiment of the invention, the bed is defined by an upwardly open container and the particulate is sand within the container. The upper end of the container is provided with a flared peripheral collar for capturing sand rising above the container and falling back toward the same.

Desirably a sand exchange port extends between the container and the exterior of the vessel and a perforated conduit is disposed in the container and is connected to the inlet. The perforated conduit serves as a distributor for the mixture within the container.

The invention further contemplates that the crosssectinal area of the first outlet and above the latter be small in relation to that of the second outlet to maximize the ability of the system to reliably separate, i.e., assure relative purity of the low density component exiting the apparatus.

Desirably, the vessel is provided with a sludge removal port at the bottom thereof.

In a highly preferred embodiment, the cross-sectional area of the vessel between the inlet in the location whereat the conduit opens below the inlet is sufficiently large as to prevent entrainment of the lower density constituent by flow of the higher density constituent as it flows from the inlet to the location.

Other objects and advantages will become apparent from the following specification taken in connection with the accompanying drawing.

DESCRIPTION OF THE DRAWING

The FIGURE is a somewhat schematic, sectional view of a separator made according to the invention.

DESCRIPTION OF THE PREFERRED EMBODIMENT

An exemplary embodiment of a separator made according to the invention is illustrated in the FIGURE. The separator is for the purpose of continuously separating a mixture of immiscible liquids into the constituents of the mixture. As illustrated in the drawing, it is specifically designed for separating oil, the lower density constituent, from water, the higher density constituent.

The separator includes a vessel, generally designated 10 having a cylindrical midsection 12, an upper, bell-shaped section 14 and a lower, inverted bell-shaped section 16. The upper bell-shaped section 14, at its top, includes a port 18 in fluid communication with a vertically elongated conduit 20 that extends vertically upwardly to a first outlet 22.

Near the bottom of the bell-shaped section 16, a conduit 24 includes a flared opening 26. The conduit 24 extends upwardly through the vessel 10 and in side by side relation with the conduit 20 to terminate in a second outlet 28.

Near its upper end, the second outlet 28 widens as in the area marked 30 so that its cross-sectional area is considerably greater than the cross-sectional area of the first outlet 22. The purpose of this structure will become apparent hereinafter.

An inlet to the vessel is shown at 32 and it will be seen that the inlet 32 is above the opening 26 to the conduit 24 and below the outlets 22 and 28. The inlet 32 is connected by means of a conduit 34 to a perforated conduit 36 which includes a series of apertures 38 and is disposed within the lower end of an upwardly open container 40.

The mixture to be separated is introduced into the vessel via the inlet 32 and is distributed about the interior of the container 40 by the perforated conduit 36 which acts as a distributor therein.

Within the container 40 is a bed of particulate material 44 such as sand used in water purification filters.

The mixture to be separated moves upwardly within the container 40 as illustrated by an arrow 42 and droplets of the lower density constituent, oil, tend to coalesce on the particles of the bed 44 to form larger droplets 46. Because the droplets 46 are of the lower density material, they will rise within the liquid within the vessel 10 to ultimately exit the vessel 10 via the port 18. They will continue to coalesce with each other as they rise toward the first outlet 22 and the upper end of the conduit will be filled with a relatively pure column of the lower density constituent.

The fact that the lower density constituent tends to move upwardly within the vessel 10 also tends to displace the higher density component, water, toward the bottom of the vessel as indicated by arrows 48. The water moves downwardly at a very low velocity to finally enter the opening 26 to the conduit 24. In this respect, the cross-sectional area of the vessel 10 between the upper end of the container 40 and the opening 26 of the conduit 24 is sufficiently large that the downward velocity of the liquid is insufficient to entrain droplets 46. Thus, droplets forming even below the upper end of the container 40 are free to move upwardly toward the port 18.

Desirably, the container 40 is provided with a peripheral, flared collar 50 at its upper end. Should any of the particulate of the bed 44 rise above the container 40 during a surge at the inlet 32 or the like, upon resumption of normal velocity gradients within the container 10, the same will settle down and be recaptured by the flared collar 50.

The container 40, near its lower end, can also be provided with a sand exchange port 52 extending to the exterior of the vessel. Through such means, the sand or other particulate forming the bed 44 may be added to or removed from the container 40 as desired.

In addition, at the lower end of the inverted bell-shaped housing 16, a sludge removal port 54 may be located. Finally, an air distributor 56 may be located in the bell-shaped segment 14 and connected to a controllable source of air via a conduit 58 if desired.

Because of the difference in densities of the two components, the column of the lower density component at the first outlet 22 will terminate at a higher level than will the column of the higher density component within the second outlet 28. This difference is illustrated with the marking $\Delta D$ in the FIGURE and this feature assures reliable, high percentage separation of the constituents of the mixture. Specifically, because of the relatively small crosssectional area of the first outlet 22 as well as its location above the second outlet 28, there will exist a substantial virtually pure column of the lower density constituent, i.e., oil, from the level of the outlet 22 on downwardly. Any surge at the inlet 32 will result in an increase in the discharge rate at the second outlet 28 without the overflow of the high density component out of the first outlet 22 since that component will never rise in the first outlet 22 above the level of the second outlet 28.

In this regard, the overall extension of the conduits 20 and 24 above the vessel 10 is selected to provide a $\Delta D$ that is sufficiently large to prevent undesirable overflow of the higher density constituent from the outlet 22 for the large surge contemplated.

As a consequence, the lower density component exiting the separator via the second outlet 22 will be virtually free of the higher density component providing excellent separation.

In some cases, the higher density component being removed from the second outlet 28 may be fed on to a second stage of separation which may be performed in a separator such as shown or even subject to a totally different type of separation process.

From the foregoing, it will be appreciated that a separator made according to the invention contains no moving parts and accordingly may be operated with a great degree of reliability. The same lends itself to use in a continuous process and the only energy expended is that required to deliver the mixture to be separated to the inlet 32

The use of the coalescer including the bed 44 of particulate material facilitates use of the separator with any kind of pump including, for example, high speed centrifugal pumps which would tend to emulsify the mixture. At the same time, where the pump is not of the type that would cause such intimate mixing or emulsification to occur, it will be appreciated that the coalescing bed 44 can be omitted if desired.

I claim:

1. A separator for continuously separating a mixture of immiscible liquids of differing densities into its constituents comprising:
    a vessel;
    a first upper outlet for the lower density constituent;
    a second upper outlet for the higher density constituent; coalescing means located in said vessel for coalescing droplets of the lower density constituent, said coalescing means including a bed of relatively fine particulate open to said vessel at its upper end and defined by an upwardly open container with said particulate being sand within said container, the upper end of said container being provided with a flared, peripheral collar for capturing sand rising above said container and falling back toward the same;
    an inlet in said vessel for said mixture located below said outlets and opening to said bed near its lowermost end;
    means above said inlet establishing fluid communication between said vessel and said first outlet; and
    means including a conduit opening below said inlet establishing fluid communication between said vessel and said second outlet.

2. The separator of claim 1 further including a sand port extending between said container and the exterior of said vessel.

3. A separator for continuously separating a mixture of immiscible liquids of differing densities into its constituents comprising:
    a vessel including a cylindrical midsection and an upper, bell-shaped section;
    vertically elongated conduit means extending from said bell-shaped section vertically upwardly and including a first flow path opening in fluid communication with the interior of said vessel at the center of said upper, bell-shaped section and a second flow path isolated from said first flow path and opening to be in fluid communication with the interior of said vessel at a location below said cylindrical midsection;

each of said flow paths having outlets well above said vessel with the outlet for the first flow path serving as an outlet for the lower density constituent and being located above the outlet for the second flow path which serves as the outlet for the higher density constituent;

a central container within said vessel within the vicinity of said cylindrical mid section, said container having a central open top facing said bell-shaped section below the opening of aid first flow path and a closed bottom disposed above the opening of the second flow path, the uppermost edge of said container being radially inwardly of the walls of said vessel;

a bed of particulate material in said container; and an inlet to said vessel including a conduit extending from a point exterior of said vessel into said container and terminating with a distributor below said bed of particulate material so that a mixture entering said vessel through said inlet is forced to flow upwardly through said bed of particulate material from said distributor by said closed bottom.

4. The separator of claim 3 further including an additional conduit extending between the exterior of said vessel and the interior of said container at or near the bottom thereof through which particulate may be added to and/or removed from the container.

5. The separator of claim 4 wherein said container is centrally located within said vessel and said upper edge is sufficiently spaced from the walls of said vessel as to allow downward flow of the higher density constituent within the vessel at a velocity that is sufficiently low that the lower density constituent of the mixture will not be entrained therewith.

* * * * *